United States Patent [19]

Cox et al.

[11] 4,012,689

[45] Mar. 15, 1977

[54] RADIO FREQUENCY RESISTIVITY AND DIELECTRIC CONSTANT WELL LOGGING UTILIZING PHASE SHIFT MEASUREMENT

[75] Inventors: Percy T. Cox; Richard A. Meador; Larry W. Thompson, all of Houston, Tex.

[73] Assignee: Texaco Inc., New York, N.Y.

[22] Filed: Oct. 24, 1974

[21] Appl. No.: 517,704

[52] U.S. Cl. .................................... 324/6
[51] Int. Cl.² ...................... G01V 3/10; G01V 3/18
[58] Field of Search ...................... 324/5–8

[56] References Cited

UNITED STATES PATENTS

| | | | |
|---|---|---|---|
| 3,209,254 | 9/1965 | Hossmann | 324/83 D |
| 3,539,911 | /9170 | Youmans et al. | 324/6 |
| 3,551,797 | 12/1970 | Gouilloud et al. | 324/6 |
| 3,657,659 | 4/1972 | Johnson | 324/83 D |
| 3,760,270 | 9/1973 | Irvin | 324/83 D |
| 3,849,721 | 11/1974 | Calvert | 324/6 |
| 3,906,361 | 9/1975 | Nessler et al. | 324/83 D |

FOREIGN PATENTS OR APPLICATIONS

| | | | |
|---|---|---|---|
| 272,450 | 11/1970 | U.S.S.R. | 324/6 |

OTHER PUBLICATIONS

Daev, D. S., *Dielectric Induction Logging IZV* Vyssh. Ucheb Zaved., Geol. Razved. 8, No. 11, pp. 110–119(1965).
Antonov et al., *Two—Frequency Dielectric Induction Logging With Two Sondes* Geol. Geofiz. 9, No. 4, pp. 94–101 (1968).

*Primary Examiner*—Gerard R. Strecker
*Attorney, Agent, or Firm*—T. H. Whaley; C. G. Ries; William J. Beard

[57] ABSTRACT

The invention disclosed herein includes methods and apparatus for determining the resistivity and dielectric constant of earth materials in the vicinity of a well borehole. A radio frequency electromagnetic field in the frequency range from 20 to 40 megahertz is generated in a borehole and the total electromagnetic field at two longitudinally spaced locations is detected. Measurements of the relative phase shift in the field between the detector locations and the amplitude of the field at least at one of the detector locations may then be interpreted according to predetermined relationships in terms of the earth formation resistivity and dielectric constant.

6 Claims, 6 Drawing Figures

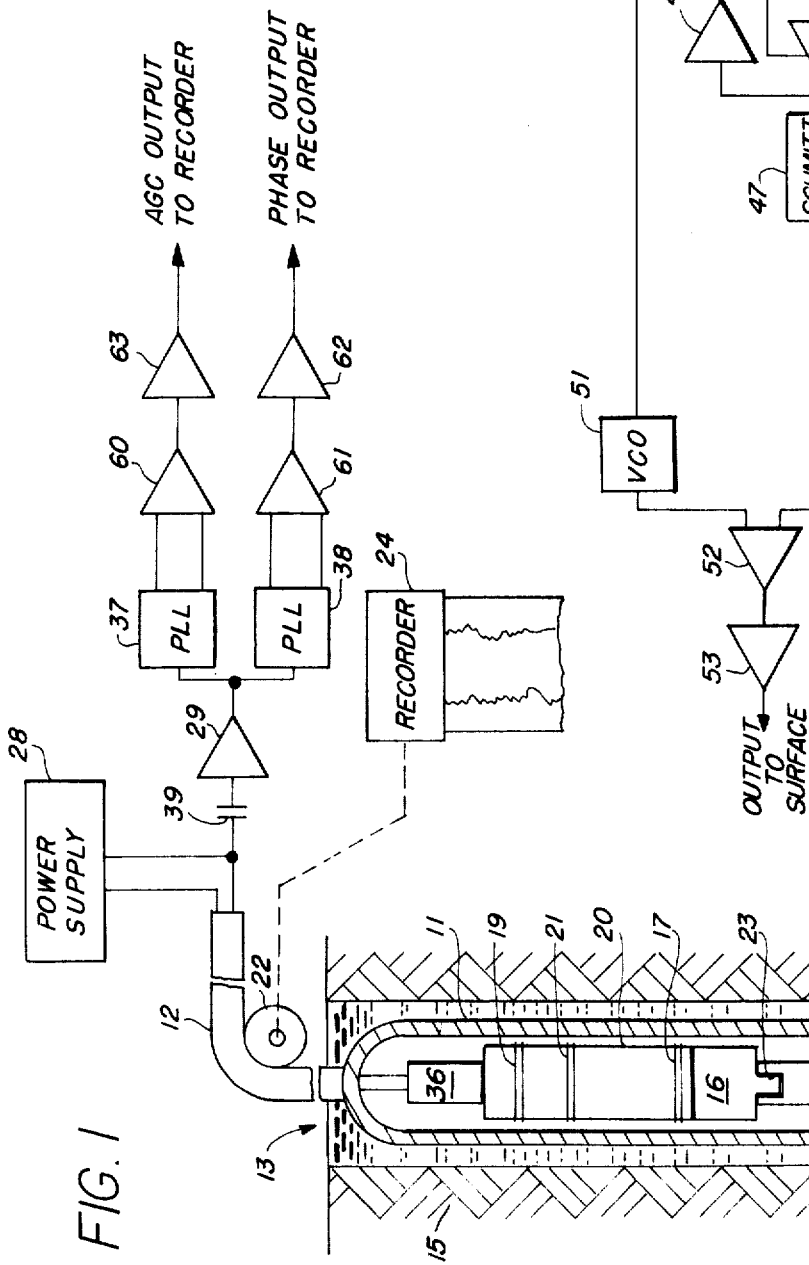
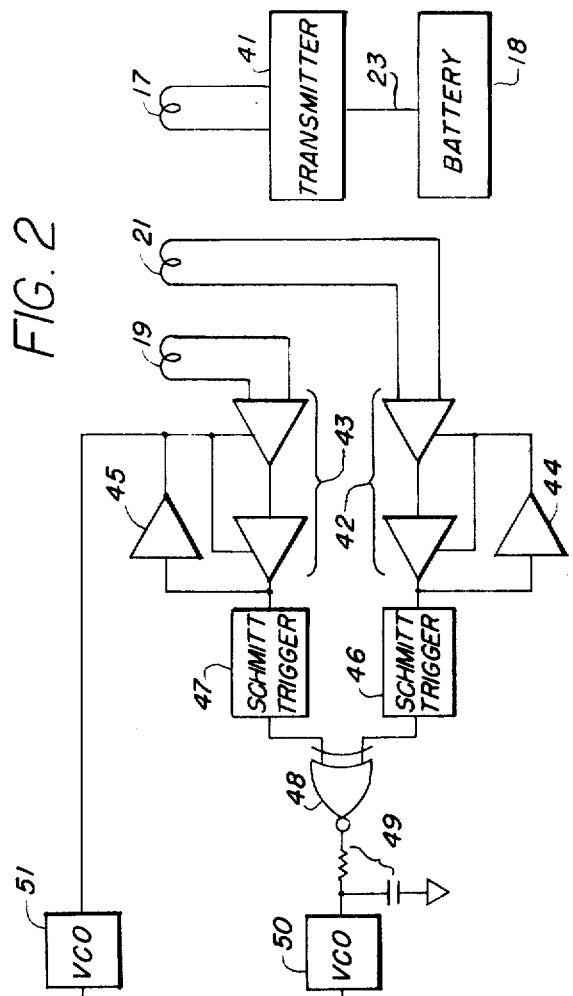
FIG. 1
FIG. 2

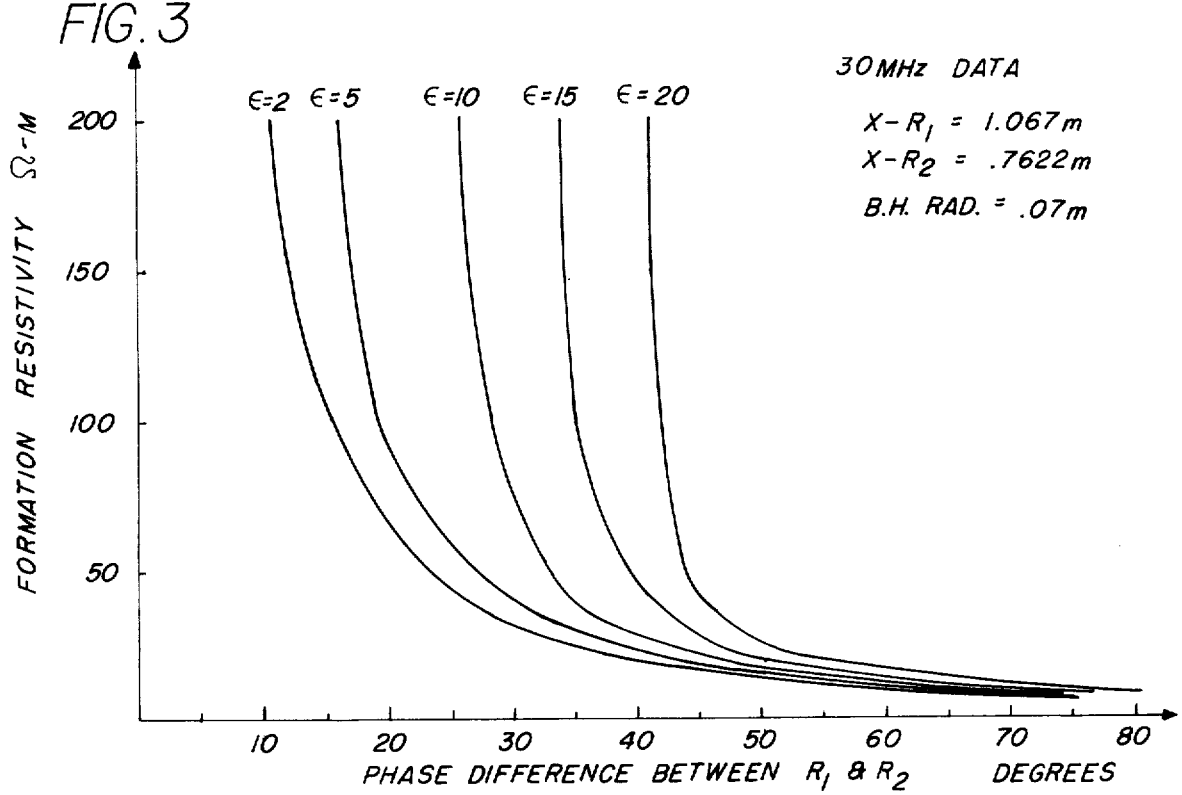
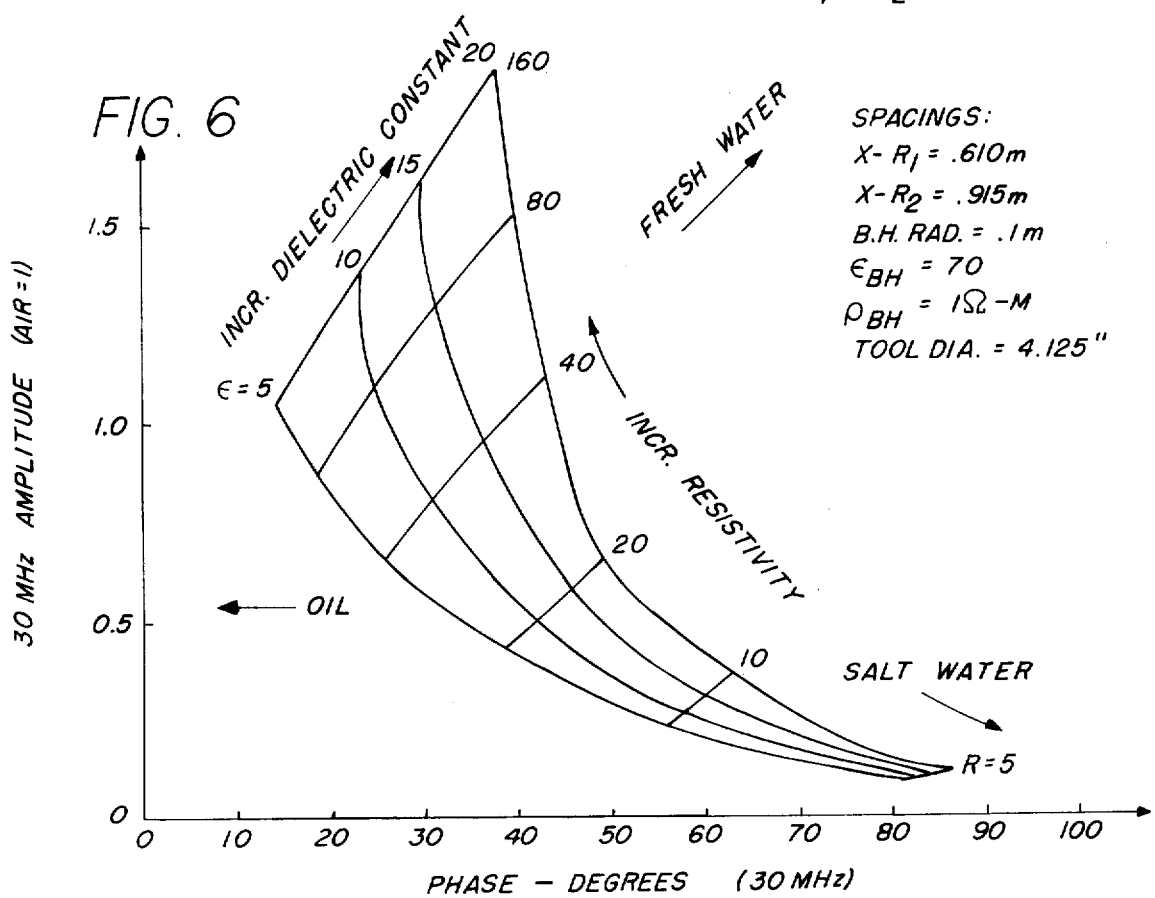

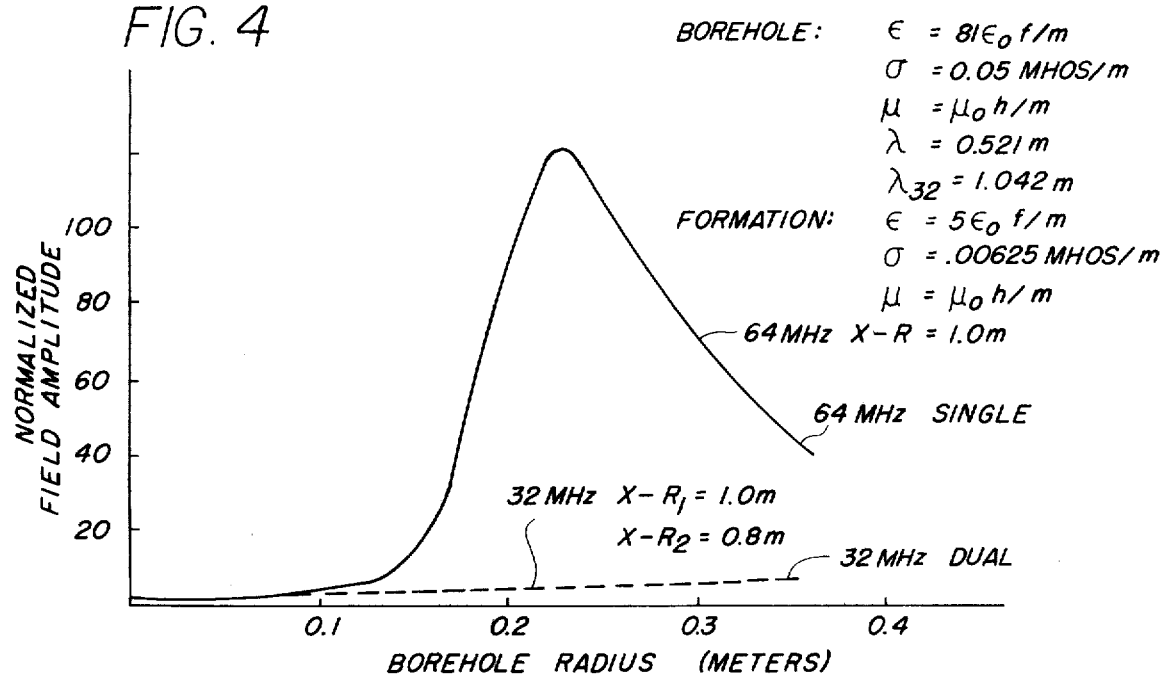
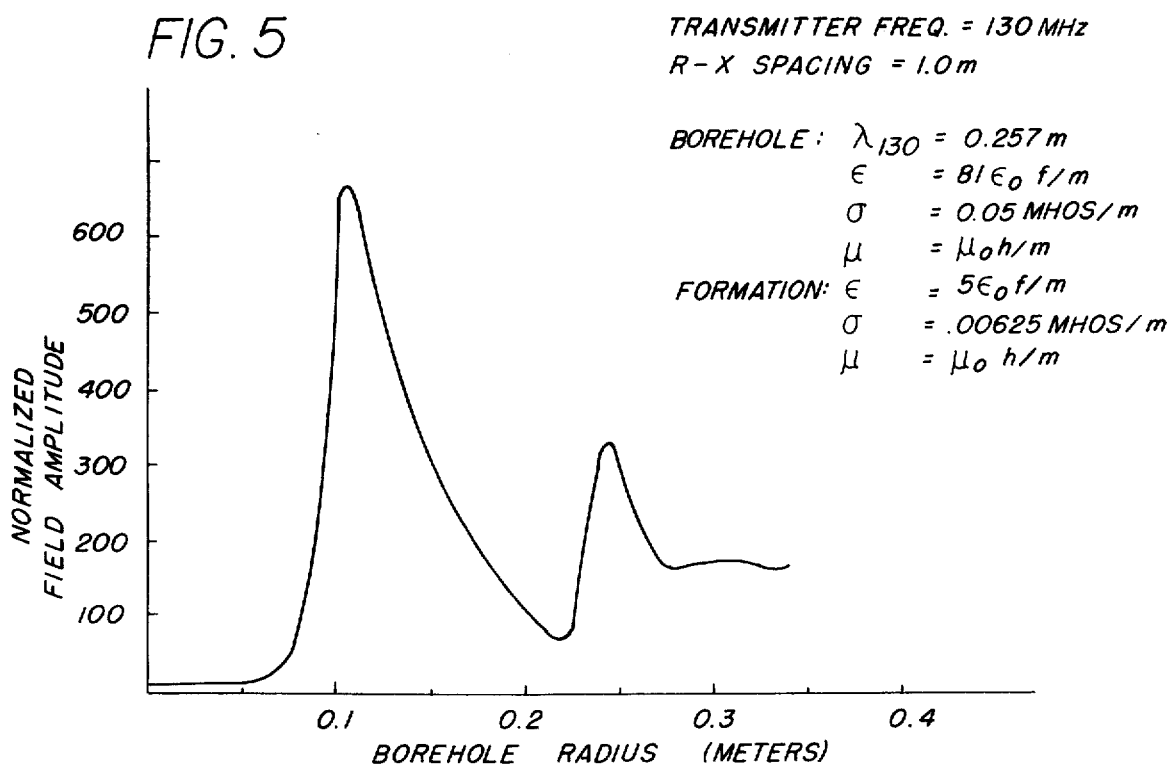

RADIO FREQUENCY RESISTIVITY AND DIELECTRIC CONSTANT WELL LOGGING UTILIZING PHASE SHIFT MEASUREMENT

BACKGROUND OF THE INVENTION

This invention relates to methods and apparatus for determining the characteristics of material surrounding a well bore and, more particularly, relates to methods and apparatus for radio frequency dielectric induction well logging wherein the formation resistivity (or conductivity) and dielectric constant are uniquely determinable by means of the in situ measurements taken in a well bore hole.

For many years, it has been conventional practice to log the electrical characteristics of earth formations in the vicinity of a well bore hole in order to determine the location of an oil bearing strata. This has been made possible by the use of electrical resistivity logs in wells using highly conductive (low resistivity) drilling fluid and by the use of induction well logs in wells drilled with oil base drilling muds or drilling fluids having higher resistivity. In conventional resistivity logs, a current emitting electrode (or electrode array) arranged for focusing the emitted current is used to emit either direct current or very low frequency (such as 60 hertz) alternating current into the earth formations surrounding the well borehole by means of contacting electrode. These currents traverse a section of the earth formations and are detected at a current return electrode situated at spaced distance from the current emitting electrode or electrode array. The magnitude of the detected currents can then provide an indication of the resistivity of the earth formation surrounding the well bore. In some cases, current electrodes are used in conjunction with measuring potential electrodes to determine the formation resistivity.

In electrical induction logging it has been conventional practice in the past to provide a well logging sonde having a transmitting coil (or array of coils) disposed thereon and a receiver coil (or array of coils) at a spaced distance therefrom. Generally, a high frequency alternating current is passed through the transmitter coil (normally at a frequency of approximately 20 kilohertz). The resulting electric fields produced from this high frequency alternating current in earth formations surrounding the well bore are detected at the spaced receiver coil by sensing the induced current or voltage in the receiver coil.

In both of these types of prior art resistivity (or conductivity) logging system, the usefulness of the system arises from the fact that earth formations having pore spaces therein filled with hydrocarbon molecules exhibit a higher resistivity than those earth formations having the pore spaces therein filled with either salt water or some other conducting fluid.

Various problems have arisen in the interpretation of either conventional induction logging records or resistivity logging records of wells in area where fresh water (relatively nonconductive, such as less than 10,000 parts per million sodium chloride) are encountered. Such fresh water bearing sands or earth formations exhibit high resistivity (or low conductivity) much the same as those encountered in hydrocarbon bearing formations. In these cases, it is difficult if not impossible to distinguish on the basis of the electric or induction well logging data alone, whether an earth formation which is a prospective producing zone contains fresh water or hydrocarbon. It would, therefore, be very beneficial to provide a well logging system which on the basis of a single measuring pass of some of the physical characteristics of the earth formation in the vicinity of the well borehole, could distinguish between fresh water bearing and hydrocarbon bearing earth formations.

Accordingly, it is an object of the present invention to provide a well logging system which is capable of distinguishing fresh water bearing earth formations from hydrocarbon bearing earth formations in the vicinity of the well borehole on the basis of electrical measurements.

Another object of the invention is to provide an electrical measurement well logging system which is capable of measuring simultaneously quantities relating to the conductivity and dielectric constant of earth formations in the vicinity of a well borehole.

Another object of the present invention is to provide an induction well logging system which operates at frequencies such that the dielectric properties of the media surrounding the well borehole influence the measurement together with the conductivity or resistivity characteristics of the material surrounding the well bore.

BRIEF DESCRIPTION OF THE INVENTION

The above and other objects, features and advantages are provided in the present invention by a well logging system comprising a radio frequency dielectric induction logging system. In the well logging system of the present invention, a downhole well logging sonde is provided which contains radio frequency dielectric measurement apparatus. The radio frequency dielectric induction logging apparatus comprises a 30 megahertz transmitting apparatus together with two different spaced receiver coils. At the radio frequency chosen for use in the present invention, the physical characteristics of the earth formations surrounding the well bore which influence the high frequency alternating currents induced in the formations by the transmitting apparatus include both the dielectric constant (or permittivity) of the earth formations together with conductivity (or resistivity) characteristics of the earth formation in the vicinity of the borehole. By measuring a signal proportional to the amplitude of the received signal at one of the receiver coils and by measuring the radio frequency phase shift of the signal between the two receiver coils, both the dielectric characteristics and the conductivity characteristics of the earth formations in the vicinity of the borehole may be determined. Novel apparatus for performing the amplitude measurement and the phase shift measurement at the radio frequency is provided together with means for interpreting the measured amplitude and phase shift to derive the conductivity and dielectric constant of the earth formations in the vicinity of the borehole.

The novel concepts of the present invention are pointed with particularly in the appended claims. The invention is best understood by reference to the following detailed description thereof when taken in conjunction with the accompanying drawing in which:

BRIEF DESCRIPTION OF THE DRAWINGS

FIG. 1 is a block diagram illustrating the overall layout of a radio frequency induction dielectric logging sytem in accordance with the present invention;

FIG. 2 is a schematic block diagram illustrating the downhole electronics portion of FIG. 1;

FIG. 3 is a theoretically derived plot of the phase difference between receiver coil 1 and receiver coil 2 of the apparatus of FIG. 1 plotted against earth formation resitivity and a function of dielectric constant;

FIG. 4 is a theoretically derived graph illustrating the amplitude variations of a 64 megahertz radio frequency induction sonde for different borehole diameters from 0 to 0.35 meters;

FIG. 5 is a theoretically derived graph illustrating the amplitude variation of a 130 megahertz single source radio frequency induction logging sonde for borehole diameters ranging from 0.0 to 0.4 meters; and FIG. 6 is a theoretically derived graph of the phase shift between receiver coils 1 and 2 of the apparatus of FIG. 1 plotted against the amplitude of the signal at receiver coil 2.

DETAILED DESCRIPTION OF THE INVENTION

Induction and resistivity logs have proven useful in the past in determining earth formation resistivity and thereby locating oil bearing sands in the vicinity of the well borehole. However, due to the fact that fresh water sands and oil sands have similar high resistivities, these logs (conventional induction and resistivity) cannot adequately detect the difference between oil and fresh water filling the pore spaces of the earth formation in the vicinity of the borehole. At radio frequencies, however, the possibility of measuring both the formation electrical conductivity and formation permittivity can provide a means for distinguishing these types of liquid bearing strata. Hydrocarbons have a characteristically low dielectric constant $\epsilon_r$ less than 5. On the other hand, fresh water has a relatively high dielectric constant $\epsilon_r$ approximately equal to 80. The permittivity of a material ($\epsilon$) is defined as the neutral electrical polarization of this material. In this description the terms relative permittivity and dielectric constant $\epsilon_r$ will be used synonymously. These quantities are related to the permittivity of free space $\epsilon_o$ by the relationship given in Equation 1.

$$\epsilon = \epsilon_r \epsilon_o \quad (1)$$

Where $\epsilon_o$ equals 8,854 picofarads per meter, the permittivity of free space.

From electromagnetic field theory and in particular from the theory of a point source oscillating magnetic dipole, the behavior of radio frequency fields in the vicinity of a cylindrical well borehole may be expressed as in Equation 2 (the Helmholtz equation in conventional cylindrical coordinates r, $\phi$ and Z):

$$\left[\frac{1}{\rho}\frac{\partial}{\partial \rho}\left(\rho\frac{\partial}{\partial \rho}\right)+\frac{1}{\rho^2}\frac{\partial^2}{\partial \phi^2}+\frac{\partial^2}{\partial Z^2}+K^2\right]\pi_z^{(m)} = \frac{-j}{\omega\mu}I^{(m)}\frac{\delta(\rho)\delta(Z)}{\rho} \quad (2)$$

Where $\pi_z^{(m)}$ is the Hertz magnetic vector; $I^{(m)}$ is the magnitude of the current; $j = \sqrt{-1}$. In Equation 2, K is the complex wave number given by Equation 3.

$$K^2 = \omega^2\mu\epsilon + j\omega\mu\sigma \quad (3)$$

In Equation 2, $\delta(\rho)$ and $\delta(Z)$ are unit impulse functions of the Dirac type. $\omega = 2\pi F$ where F is the frequency of oscillation of the point magnetic dipole; $\epsilon$ is the electric permittivity of the media. $\mu$ is the magnetic permittivity of the material surrounding the magnetic dipole and $\sigma$ is the electrical conductivity of the media.

It will be observed from Equations (2) and (3) that there are three physical constants associated with the material surrounding the oscillating point magnetic dipole. These are the relative magnetic permability $\mu$, the electrical permittivity $\epsilon$ and the electrical conductivity $\sigma$. For most earth formations at the frequencies of interest in the present invention (10 to 60 megahertz) the relative magnetic permability $\mu$ may be taken as a constant. Variations in $\mu$ in the earth materials of interest generally fall in the range of 0.001 to 0.1 percent. Thus, only the two media constants contributing a significant variation from one earth material to another at the frequencies of interest are $\epsilon$ and $\sigma$. These two physical characteristics have a direct effect on any very high frequency alternating electrical current flowing in the media. Both of these physical properties of the media have an effect on the magnitude and the phase with respect to the transmitter of these induced or eddy currents in formations in the vicinity of a well borehole.

Assuming a point magnetic source placed in a cylindrical borehole and responding to the Helmholtz equation, the total field is defined as the field of the source which is sensed by a receiver coil in any media. The total field may be separated into a primary field and a secondary field. The primary field is defined to be the field of the source which is sensed by the receiver coil in some reference media (such as vacuum or air). The secondary field is defined as the field which, when added vectorially to the primary field, results in the total field. The primary field has an amplitude and phase which are equal to the amplitude and phase of the total field in the reference medium. When the source is placed in a medium which is different from the reference medium, the secondary field adds vectorially to the primary field to produce the total field within the new medium. The primary field serves as an amplitude and phase reference for the determination of the secondary field. The currents that flow in the medium surrounding the oscillating point magnetic dipole are called "eddy currents". The eddy currents generate secondary fields which in case of a highly conductive medium act to oppose the primary or reference field. However, when $\omega\epsilon$ (the angular operating frequency multipled by the electrical permittivity) approaches the magnitude of $\sigma$(the electrical conductivity) the eddy currents are phase shifted and may actually result in the secondary fields which increase the magnitude of the total field. This is commonly the case when operating at the frequencies of interest in the present invention, which may generally be stated to comprise radio frequencies in the range from 10–60 megahertz.

Since changes in both $\epsilon$ and $\sigma$ effect changes in the eddy currents at any given frequency, the measurements of a single voltage amplitude of the field cannot separate the two effects. However, in accordance with the principle of the present invention a measurement of the amplitude of the total field at one receiver coil, together with the phase shift produced between the two receiver coils, may be combined to derive $\epsilon$ and $\sigma$ simultaneously. Other techniques may also be used for this purpose such as those disclosed in the co-pending patent application Ser. No. 391,900 filed Aug. 27, 1973 and assigned to the assignee of the present invention, but will not be discussed here.

The Helmholtz equation (Equation 2) is valid in any cylindrical layer of a layered medium surrounding the point magnetic dipole in the borehole. By use of a computer program to perform numerical integration of the solution of Equation 2 in various cylindrical layers about such a point magnetic dipole and by applying boundary conditions as the interface of these regions and at the source, the total field at a receiver coil displaced a distance Z along the borehole axis from the point magnetic dipole may be derived.

Through studies of the numerical solution of the Helmholtz equation in boreholes of various diameters, graphical representations of the amplitude of the field at a receiver coil as a function of the borehole diameter for various size borehole may be made. Such a graphical representation is illustrated in FIG. 4 for a 64 megahertz single coil transmitter and single coil receiver system. It may be observed in FIG. 4 that at a frequency of 64 megahertz, what appears to be an anomalous resonance effect occurs at a borehole radius of about 10 inches. It can be observed that the 32 megahertz dual transmitter coil amplitude response does not exhibit this type of resonance effect for reasonably sized boreholes.

Referring now to FIG. 5, a graphical representation illustrating the normalized total field amplitude at a receiver coil on the Z axis of the borehole as a function of the borehole radius for an operating frequency of 130 megahertz is illustrated. In this case, the resonance effect is exhibited at a borehole radius of about 0.1 meters (4 inches) and again at a borehole radius of 0.25 meters (10 inches). Thus, if it were attempted to measure the dielectric or conductivity property of the material surrounding the well bore at frequencies as high as 64 megahertz, it is apparent from the graphical representations of FIGS. 4 and 5 that some correction would possibly be needed for these resonance effects.

On the other hand, it will be remembered that in order to determine both the electrical conductivity and permittivity (or dielectric constant) of the material surrounding the well bore, measurements must be made of the amplitude of the received signal and the relative phase shift between the receiver coils in order to interpret the resulting amplitude measurements in terms of both the dielectric constant $\epsilon$ and the conductivity $\sigma$ of the earth formation surrounding the borehole. A theoretical plot of the phase difference the receiver coils versus the resistivity for a plurality of different dielectric constants is given in FIG. 3 for the borehole parameters and the receiver coil spacing indicated thereon.

Referring to FIG. 3, it will be seen that the relative phase shift between the receiver coils may be interpreted in terms of the formation dielectric constant provided that the formation resistivity is known. This resistivity measurement could be made with a separate conventional resistivity log. In the well logging system of the present invention, however, a signal which is proportional to the amplitude of the received signal at one of the receiver coils is used to relate to the earth formation resistivity. In FIG. 6 a plot of the phase shift between spaced receiver coils is plotted against the total field amplitude at one of the coils. The measurement of this phase shift and amplitude may then be interpreted by means of FIG. 6 in terms of earth formation dielectric constant and resistivity simultaneously.

Further, by operating at the chosen frequency of the present invention (30 megahertz), resonance effects such as those detected in FIGS. 4 and 5 are avoided. Theoretical calculations indicate that measurements made at this frequency should be more accurate than those obtained at higher frequencies because of the borehole resonance effect. Thus, the present invention by measuring the amplitude and phase shift caused by the earth formations on the signals from the transmitter at two spaced receiver coils may be utilized to accurately determine the earth formation resistivity (or conductivity) and dielectric constant.

Referring now to FIG. 1, an induction dielectric well logging system in accordance with concepts of the present invention is illustrated schematically. The well logging sonde 11 whose main body member is preferably constructed of fiberglass or some other nonconducting material of sufficient strength characteristic is shown suspended by well logging cable 12 in an uncased well borehole 13. The borehole 13 is filled with a borehole fluid 14 and is surrounded by earth formations 15 whose dielectric and conductivity properties are to be measured.

The lower portion of the well logging sonde 11 is seen to be basically comprised of a transmitter electronic section 16 which will be discussed in more detail subsequently and associated transmitting coil 17. Coil 17 is wound about a central strength member or mandrel 20 which is also preferably constructed of a nonconducting material such as fiberglass. The transmitter is powered by battery pack 18 whose power is conducted thereto through a slip ring arrangement 23. The transmitter coil 17 is operated at a frequency of 30 megahertz as will described in more detail subsequently. A first receiver coil 21 is spaced axially along the axis of the sonde 11 from the transmitter coil 17 and is situated approximately 61 centimeters therefrom. A second receiver coil 19 is situated approximately 91.5 centimeters from the transmitter coil 17 of the 30 megahertz transmitter. It will be appreciated by those skilled in the art that while these transmitter and receiver coil spacings have been found useful in practicing the concepts of the present invention, that they are intended as being illustrative only. It may be entirely practical to utilize other than the disclosed spacing distances between the transmitter and receiver coils and other coil spacings between the receiver coils are considered to be within the scope of the invention.

The radial depth of investigation of the induction dielectric logging system of the present invention is influenced by the spacing distance between the transmitting and receiving coil. In general, the longer the spacing between the transmitter and receiver coil, the deeper the radial depth of investigation into the earth formations in the vicinity of the borehole. However, it will be appreciated that it is necessary to space the transmitter and receiver coils close enough together to assure reception of a usable signal level from the earth formations having various conductivity and dielectric properties. As a highly conductive material adjacent to the borehole will substantially attenuate signals at the radio frequency used in practicing the present invention, they it will be required to utilize a higher transmitting power as the distance between the transmitter and receiver coils is increased. A conventional winch arrangement (not shown) is used at the surface for moving the logging sonde 11 through the borehole during a well logging operation. A sheave wheel 22 over which the logging cable 12 passes may be electrically or mechanically coupled to a data recorder 24. The recorder 24 is used to record signals from the downhole sonde 11 as a function of its depth in the borehole 13 as will be described in more detail subsequently. Power for operation of the downhole receiver electronics section 36 is provided on the conductor of the well logging cable 12 by surface power supply 28. Electrical measurement signals detected by the receiver electronics portion 36 of the logging tool 11 are amplified by an input buffer amplifier 29 and supplied to a pair of phase-lock loop detector 37 and 38, whose function will be described in more detail subsequently. The receiver electronics section 36 output signals as will be described in more detail subsequently, may generally be considered as comprised of an amplitude measurement signal and a phase measurement signal which are transmitted on the cable 12 conductor in the form of a pair of frequency modulated signals.

Referring now to FIG. 2, the downhole electronics portion of the system is illustrated in the form of a block diagram. A battery pack 18 which may comprise rechargable nickel cadmium batteries or the like are connected to the transmitter electronics section 41 by the slip ring assembly 23 illustrated in FIG. 1. This method of connection allows the battery power to be easily turned on in the field and provides a means of inserting a fresh battery pack while the discharged batteries are being recharged. The transmitter electronics 41 comprise a 30 megahertz crystal controlled three-stage class C circuit which incorporates standard radio current design. Output from the transmitter is coupled to the transmitter coil 17 in the form of approximately two watts of radio frequency power which is used to excite the earth formations in the vicinity of the well borehole. The transmitter coil 17 comprises a standard two-turn coil made from ⅛ inch diameter copper tubing wound on the two inch outside diameter sonde mandrel 20. The turns spacing of the coil is two-turns per inch. Grooves are machined in the mandrel to provide location for the transmitter and receiver coils.

The induction dielectric logging system of the invention uses two identical 30 megahertz receivers to amplify the very small signals detected by the receiver coils 19 and 21. Receiver coils 19 and 21 are identical single turn windings spaced about 30 centimeters apart. The coils are electrostaticly shielded. Receiver coil 21 is about 61 centimeters from the transmitter coil 17 and receiver coil 19 is about 91.5 centimeters from the transmitter coil. The induced voltages in the receiver coils are coupled to a pair of identical 30 megahertz receivers, 42 and 43. The identical 30 megahertz receivers, 42 and 43 are each two-stage integrated circuit amplifiers using tuned resonant circuits and automatic gain control. Toroid coils are used in the tuned circuits of the receivers 42 and 43 to keep the electric field about the coil tight and to help eliminate oscillation in the amplifiers. The automatic gain control system used in the integrated circuit amplifier limits the output of the amplifiers to approximately 0.7 volts, peak to peak, for input signals of approximately 20 microvolts rms or greater. It is desirable to maintain as near a constant receiver output amplitude as possible to allow accurate phase difference measurement from the two receiver coils. These automatic gain control signals are provided by automatic gain control amplifiers 44 and 45.

The two receiver 42 and 43 outputs are converted from sine wave form to square waves using emitter-coupled logic gates 46 and 47 connected as Schmitt trigger circuits. The emitter coupled logic integrated circuits are ideal for this purpose due to their fast rise time capabilities. The steep sided 30 megahertz square waves obtained from the Schmitt triggers 46 and 47 are then used as dual inputs to an emitter coupled logic exclusive NOR logic gate 48. The NOR gate 48 provides an output pulse whose width is proportional to the phase difference between the two input square waves from the Schmitt triggers 46 and 47. If the two input signals are in phase, there is no outside pulse. At the maximum measurable shift of 180°, the pulse width is maximum. Thus, a linear measurement of the phase shift between the two receiver coils is made possible by integrating the output pulses of the exclusive NOR gate in an integrator circuit 49 comprising a resistor-capacitor network as illustrated. This output voltage signal from integrator 49 is provided as input to a voltage controlled oscillator 15. This voltage is directly proportional to the phase shift in the radio frequency signals between the receiver coils 21 and 19.

It is important that the receiver signals be of sufficient amplitude to switch the Schmitt triggers 46 and 47 properly. If the signal level falls too low, the Schmitt triggers will not trigger at the proper time and can result in an erroneous phase shift measurement. The output signal from the automatic gain control amplifier 45 is thus provided as an input to a voltage controlled oscillator 51 for transmission to the surface. By monitoring of this signal it can be determined when the received signal levels are too low to provide a reliable phase shift measurement. Additionally, this automatic gain control voltage (which is directly proportional to the signal level at receiver coil 19) is related to the resistivity and dielectric constant of the formation surrounding the well bore. When combined with the phase shift measurement according to FIG. 6, this information may then be interpreted in terms of the dielectric constant and resistivity of the earth formations in the vicinity of the borehole.

A two-frequency modulation system comprising a pair of voltage controlled oscillators 51 and 50 together with a summing amplifier 52 and a cable driving amplifiers 53 is used to transmit the two data channels of information to the surface on the center conductor of the well logging cable 12 of FIG. 1. The voltage controlled oscillator 50 is frequency controlled by the output signal from the integrator 49 which causes the frequency of the oscillator 50 to be modulated in the range from approximately 12 kilohertz to 13 kilohertz depending on the level of the voltage signal from the integrator 49. Similarly the automatic gain control signal from the automatic gain control amplifier 45 is used to control the frequency of the voltage controlled oscillator 51 which is varied in the range from 1200 hertz to 1300 hertz depending on the level of the output signal from the automatic gain control amplifier 45. The two frequency modulated signals from voltage controlled oscillators 50 and 51 are summed in a summing amplifier 52 and further amplified to a level sufficient for transmission to the surface by the cable driver amplifier 53 before coupling to the center conductor of the well logging cable 12.

Referring again now to FIG. 1, a pair of phase-locked loop demodulation circuits 37 and 38 are used at the surface to reconstruct the original DC phase and AGC voltages from the downhole equipment. The multiplexed FM signals are picked off the cable center conductor by coupling capacitor 39 and supplied to an input buffer amplifier 29. The output from buffer amplifier 29 is coupled to a phase-locked loop demodulator circuit 37 which is responsive only to signals from 1200 to 1300 hertz range and to a phase-locked loop demodulator 38 which is responsive only to input signals in the range from 12 kilohertz to 13 kilohertz. The phase-locked loop demodulators lock on to an input frequency and tracks this frequency if the input range is within the capture range of the phase-locked loop. The output of each of the phase-locked loop demodulators 37 and 38 is a DC voltage proportional to the original DC voltage which is applied to the voltage controlled oscillators 50 and 51 of FIG. 2 in the downhole sonde. Output signals from the phase-locked loop demodulator 37 and 38 are supplied to differential amplifiers 60 and 61 for further amplification prior to input to well logging recorders 24. The recorder amplifiers 62 and 63, further amplify the signal and use it to control a motion of a pen on a strip chart recorder or the grids of a cathode ray tube if this type recorder is used.

To summarize the operation of the well logging system of the present invention, a downhole transmitter 16 is used to excite the earth formation in the vicinity of the well borehole with 30 megahertz radio frequency energy. Two spaced receiver coils 19 and 21 receive voltages induced therein by the 30 megahertz signal coupled by the transmitter to the earth formation. The relative phase shift between the signal at the two spaced receiver coils is measured by the downhole electronics and transmitted to the surface as multiplexed FM data. At the same time the amplitude of the signal at receiver coil 19 is measured and transmitted to the surface by the downhole electronics in the FM data stream. At the surface of the two signals are demodulated and supplied to a data recorder 24 which provides a continuous log as a function of borehole depth of the well logging sonde of the phase and total field amplitude information. This information may then be combined by means of a precalibrated or theoretical diagram, such as that illustrated in FIG. 6 in order that it may be interpreted in terms of the earth formation resistivity and dielectric constant. The dielectric constant information may be combined with the resistivity information in order to distinguish fresh water zones from oil zones on the basis of the relatively higher dielectric constant of the fresh water zones than that of oil. This information would not have been available previously from prior art systems which measured only the resistivity of the earth formations in the vicinity of the borehole.

The foregoing disclosure may make other alternative arrangements of the apparatus and methods of the present invention apparent to those skilled in the art. It is therefore the aim of the appended claims to cover all such changes and modifications that fall within the true spirit scope of the invention.

The embodiments of the invention in which an exclusive property or privilege is claimed are defined as follows:

1. A method for logging well boreholes to obtain measurements functionally related to the resistivity and dielectric constant of earth materials in the vicinity thereof, comprising the steps of:
   generating in a well borehole at a first location a radio frequency electromagnetic field in the frequency range from 10 to 60 megahertz;
   detecting in the borehole at a second longitudinally spaced location from said first location the total electromagnetic field at said generated frequency and generating a first signal representative thereof;
   detecting in the borehole at a third location longitudinally spaced from said first and second locations the total electromagnetic field at said generated signal frequency and generating a second signal representative thereof;
   generating a third signal functionally related to the amplitude of the total electromagnetic field at least at one of said second or third locations as an indicator of the resistivity of the earth formations in the vicinity of the borehole;
   generating from said first and second representative signals an indication of the relative phase shift of the total electromagnetic field at said generated frequency between said second and third locations; and
   combining said phase shift indication and said third signal indicative of formation resistivity to derive an indication of the dielectric constant of the earth formations in the vicinity of the borehole.

2. The method of claim 1 wherein all of said steps are repeated at a plurality of depths in the borehole and said phase shift and resistivity indications are recorded as a function of borehole depth.

3. The method of claim 1 wherein the steps of generating from said first and second representative signals an indication of the relative phase shift of the total electromagnetic field at said generated frequency further includes the steps of:
   converting said first representative signal at said generated frequency into a first square wave homolog thereof at said frequency;
   converting said second representative signal at said frequency into a second square wave homolog thereof at said frequency;
   supplying said first and second square wave homolog signals as input to an exclusive NOR logic gate to provide an output signal representative of any phase shift therebetween; and
   integrating said output signal to provide a DC voltage signal proportional to any phase shift between said representative signals.

4. The method of claim 3 wherein prior to the steps of converting said representative signals to square wave homologs thereof at said generated frequency, said representative signals are independently amplified to approximately a preselected constant amplitude by automatic gain controlled amplifiers.

5. The method of claim 4 wherein at least one of said automatic gain control amplifiers provides an amplitude output signal functionally related to the input amplitude of its respective representative signal.

6. The method of claim 4 wherein said amplitude output signal is recorded as a function of borehole depth as an indication of the resistivity of earth formations in the vicinity of the borehole.

* * * * *